United States Patent
Smith et al.

(10) Patent No.: US 10,051,926 B2
(45) Date of Patent: Aug. 21, 2018

(54) FASTENING TAPE WITH INJECTED FOAM GASKET

(71) Applicant: YKK CORPORATION OF AMERICA, Marietta, GA (US)

(72) Inventors: David Smith, Dublin, GA (US); Zhiyu Ren, Macon, GA (US); Tsuyoshi Minato, Macon, GA (US)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/018,359

(22) Filed: Feb. 8, 2016

(65) Prior Publication Data

US 2017/0224060 A1 Aug. 10, 2017

(51) Int. Cl.
*A44B 18/00* (2006.01)
*F16B 1/00* (2006.01)

(52) U.S. Cl.
CPC ........ *A44B 18/008* (2013.01); *A44B 18/0015* (2013.01); *A44B 18/0049* (2013.01); *F16B 1/00* (2013.01); *F16B 2001/0028* (2013.01); *F16B 2001/0035* (2013.01)

(58) Field of Classification Search
CPC .............. A44B 18/008; A44B 18/0049; A44B 18/0015; F16B 2001/0035; F16B 2001/0028
See application file for complete search history.

(56) References Cited

U.S. PATENT DOCUMENTS

| 5,766,723 | A | 6/1998 | Oborny et al. |
| 6,582,829 | B1 | 6/2003 | Quinn et al. |
| 7,022,394 | B2 * | 4/2006 | Fujisawa ............ A44B 18/0049 24/442 |
| 7,281,915 | B2 | 10/2007 | Billarant |
| 7,431,976 | B2 | 10/2008 | Hermann et al. |
| 8,512,845 | B2 | 8/2013 | Terada et al. |
| 2002/0164451 | A1 * | 11/2002 | Fujisawa ............ A44B 18/0046 428/100 |
| 2013/0340214 | A1 * | 12/2013 | Terada ............... A44B 18/0049 24/444 |

(Continued)

FOREIGN PATENT DOCUMENTS

| JP | 2001509698 | 7/2001 |
| JP | 2007/167678 A | 7/2007 |
| JP | 5414689 | 2/2014 |

(Continued)

OTHER PUBLICATIONS

International Search Report, PCT International Patent Application No. PCT/JP2017/004433, dated Mar. 21, 2017.

(Continued)

*Primary Examiner* — Robert Sandy
(74) *Attorney, Agent, or Firm* — Kilpatrick Townsend & Stockton LLP

(57) ABSTRACT

Described is a fastening tape that includes a plurality of attachment portions extending upwardly from a bottom portion of the fastening tape. The fastening tape also includes at least one inner wall disposed adjacent to at least some of the plurality of attachment portions and at least one outer wall offset from the at least one inner wall such that a cavity is disposed between the at least one inner wall and the at least one outer wall. Finally, the fastening tape includes an injected foam member disposed in the cavity.

14 Claims, 12 Drawing Sheets

(56) References Cited

U.S. PATENT DOCUMENTS

2014/0130311 A1* 5/2014 Okuda ............... A44B 18/0049
24/449
2014/0298628 A1* 10/2014 Minato .............. A44B 18/0049
24/449

FOREIGN PATENT DOCUMENTS

WO     2010/146667 A1    12/2010
WO     2016/002049 A1     1/2016

OTHER PUBLICATIONS

Written Opinion, PCT International Patent Application No. PCT/JP2017/004433, dated Mar. 21, 2017.

* cited by examiner

FASTENING TAPE WITH INJECTED FOAM GASKET

FIELD OF THE INVENTION

This invention relates to hook and/or loop fastening tape that includes one or more injected foam gaskets for increasing sealing effectiveness and enhancing manufacturing efficiency.

BACKGROUND

Numerous devices utilize fastening tape that includes hooks and/or loops. For example, in the automotive and other similar industries, fastening tape may be installed on a seat cushion or other component by first placing the fastener tape in a cavity or protrusion within a mold chamber. After the fastening tape has been so situated, component foam (such as urethane foam) is introduced into the mold chamber, which forms the seat cushion or other component around the fastening tape. If component foam intrudes into the fastening portion of the fastening tape, the hooks/loops of the fastening tape are more prone to failure.

In certain situations, it may be desirable to seal the fastening portion of the fastening tape from the component foam to prevent failure of the fastening tape.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Versions of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain cases, a fastening tape includes a plurality of fastening tape portions extending parallel to one another; each of the plurality of fastening tape portions comprising a plurality of attachment portions extending upwardly from a bottom portion of the fastening tape; at least one inner wall disposed adjacent to at least some of the plurality of attachment portions such that a cavity is disposed between inner walls of adjacent fastening tape portions of the plurality of fastening tape portions; and an injected foam member disposed in the cavity.

According to certain cases, a fastening tape includes a plurality of fastening tape portions extending parallel to one another; each of the plurality of fastening tape portions comprising a plurality of attachment portions extending upwardly from a bottom portion of the fastening tape; at least one row of the attachment portions acting as an inner wall of the plurality of fastening tape portions; at least one cavity disposed between adjacent fastening tape portions of the plurality of fastening tape portions; and an injected foam member disposed in the at least one cavity.

According to certain cases, a fastening tape includes a plurality of attachment portions extending upwardly from a bottom portion of the fastening tape; at least one inner wall disposed adjacent to at least some of the plurality of attachment portions; at least one outer wall offset from the at least one inner wall such that a cavity is disposed between the at least one inner wall and the at least one outer wall; and an injected foam member disposed in the cavity, wherein at least one of the at least one inner wall and the at least one outer wall extends along a majority of a length of the cavity.

BRIEF DESCRIPTION OF THE DRAWINGS

Illustrative embodiments of the present disclosure are described in detail below with reference to the following drawing figures.

DETAILED DESCRIPTION

The subject matter of versions of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-12B depict non-limiting examples of fastening tape. Although different reference numbers are used in various drawings, any of the features shown or described in relation to any of the drawings may be included, combined, substituted, or omitted to provide additional examples.

Figure 1A:
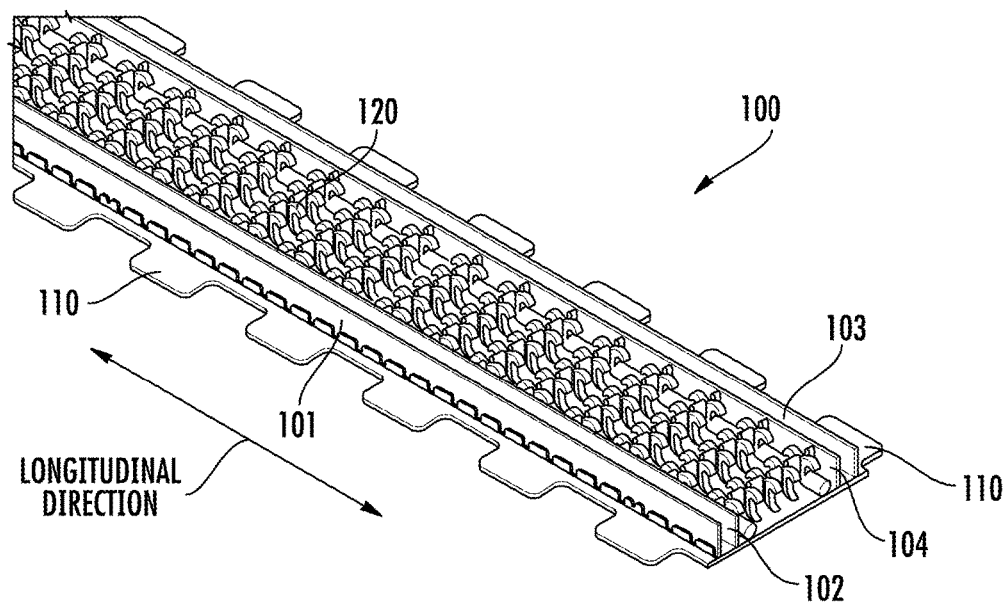
FIG. 1A is a perspective view of fastening tape according to certain aspects.
Figure 1B:
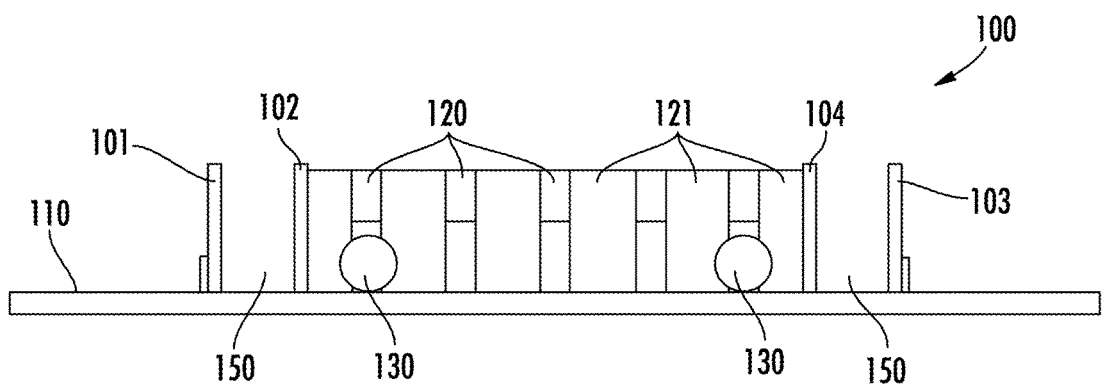
FIG. 1B is an end view of the fastening tape of FIG. 1A.

FIGS. 1A and 1B illustrate a non-limiting example of fastening tape 100 for use with improved attachment systems. As shown, the fastening tape 100 includes a plurality of attachment portions 120, outer tabs 110, one or more laterally extending walls 121, and one or more cavities 150. As shown in FIGS. 1A and 1B, the fastening tape 100 may include two cavities 150. A first cavity may include a continuous outer wall 101 offset from a continuous inner wall 102 with a cavity 150 between the two walls such that the continuous inner wall 102 is adjacent to the plurality of attachment portions 120. Similarly, the second cavity may include an outer wall 103 offset from an inner wall 104 with a cavity 150 between the two walls. As shown in FIGS. 1A and 1B, each laterally extending wall 121 may align with a row of attachment portions 120. The attachment portions 120 are illustrated as hooks, but may be loops or may be a combination of hooks and loops. If the attachment portions 120 are hooks, they may have any suitable shape and configuration.

Figure 1C:
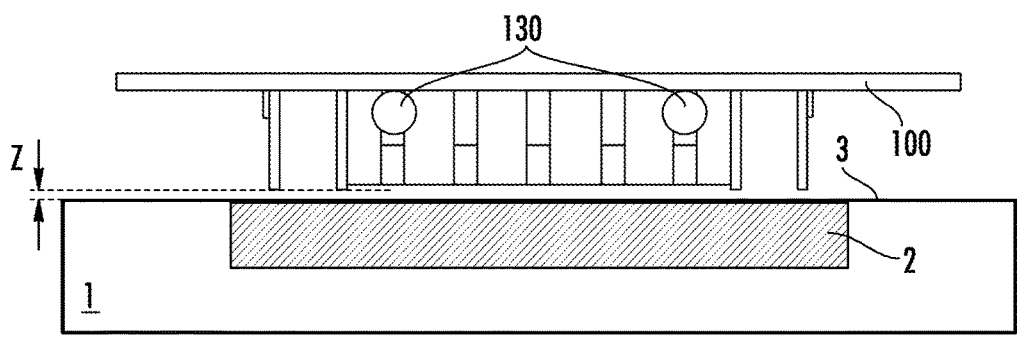
FIG. 1C is an end view of the fastening tape of FIG. 1A arranged adjacent to a mold.

In some examples, as shown in FIG. 1C, the fastening tape (100, 200, 300, 400, 500, 600, 700, 800, 900, 1000) is disposed within a mold 1 such that the upper surface of the fastening tape is adjacent to the mold surface 3 of the mold 1 with a gap Z between the fastening tape and the mold surface 3. In some cases, a magnet 2 is disposed within the mold 1 and attracts one or more magnetic portions (130, 230, 330, 430, 730, 830, 1030) of the fastening tape.

As illustrated, the inner and/or outer walls (101-104, 201-204, 301, 303, 330, 401-404, 501-504, 601-604, 701-704, 801-804, 901-904, 1001-1004, 1102a-1102c, 1104a-1104c) extend along the longitudinal direction of the fastening tape (100, 200, 300, 400, 500, 600, 700, 800, 900, 1000, 1100, 1200). In some cases, when the fastening tape is viewed from the side (orthogonal to the wall surface and perpendicular to the longitudinal direction), each of the inner and/or outer walls extends along the length and height of a side of the cavity such that each wall blocks a majority or more than approximately 50% of the side of the cavity to help retain the foam member disposed within the cavity. In some cases, the wall(s) extend along, and therefore block, a greater percentage of the cavity, such as approximately 60%, 70%, 80%, or 90% or any appropriate percentage of the cavity. This helps retain the foam member within the cavity.

Figure 2A:
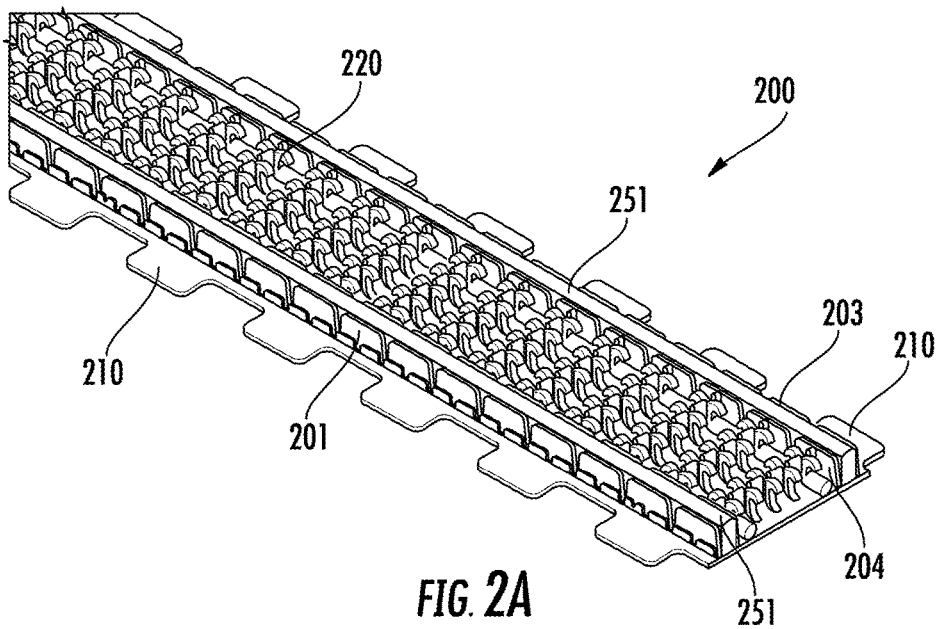
FIG. 2A is a perspective view of fastening tape according to certain aspects.
Figure 2B:
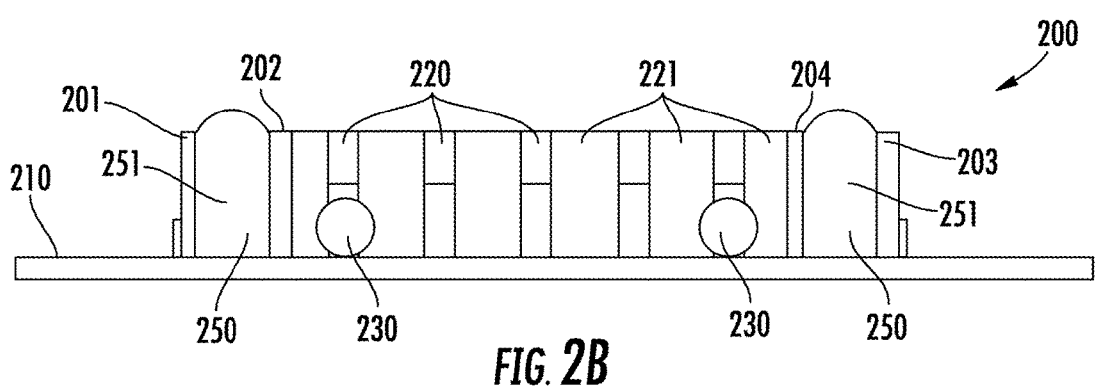
FIG. 2B is an end view of the fastening tape of FIG. 2A.
Figure 2C:
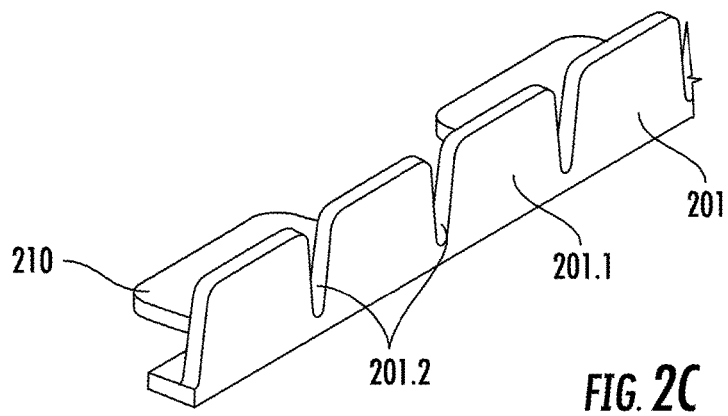
FIG. 2C is a detail view of a portion of the fastening tape of FIG. 2A.

In some examples, as shown in FIGS. 1A, 1B, 5A-5C, 11A, and 11B, some or all of the inner/outer walls may be solid continuous elements extending in the longitudinal direction of the fastening tape. To increase flexibility of the fastening tape, some or all of the inner/outer walls may be modified, either by cutting the inner/outer walls into separate pieces or by making a continuous wall with a series of notches in the inner/outer walls (e.g., see FIGS. 2A-2C, 3A, 3B, 4A, 4B, 6A, 6B, 7A, 7B, 8A-8C, 9A-9C, and 10A-10C). For example, as shown in FIG. 2C, the outer wall 201 may include main portions 201.1 separated by notches 201.2. Because the continuous inner/outer walls include the notches 201.2, the fastening tape is more flexible, thus allowing the fastening tape to conform better to a curved surface on which the tape is positioned (e.g., when the mold surface 3 is not planar). Although the notches above are described in the context of the continuous outer walls, the continuous inner walls may also include notches.

The notches in the inner and/or outer walls may be spaced apart from one another along the length of the walls (in the longitudinal direction of the fastening tape). Further, the notches may be arranged such that when the fastening tape is viewed from the side (orthogonal to the wall surface and perpendicular to the longitudinal direction), each of the inner and/or outer walls extends along the length and height of a side of the cavity such that each wall blocks a majority or more than approximately 50% of the side of the cavity to help retain the foam member disposed within the cavity. In some cases, the wall(s) extend along, and therefore block, a greater percentage of the cavity, such as approximately 60%, 70%, 80%, or 90% or any appropriate percentage of the cavity. This helps retain the foam member within the cavity. In some cases, where no notches are present (see FIGS. 1A, 1B, 5A-5C, 11A, and 11B), the walls may extend along substantially the entire length and/or height of the cavity such that approximately 100% of the cavity is blocked.

The notches define localized portion(s) of the inner and/or outer walls where the wall height (X in FIG. 5C) is reduced (i.e., less than wall height X) such that the offset ($\Delta$ in FIG. 5C) from the uncompressed height of the foam member (Y in FIG. 5C) increases (i.e., more than offset $\Delta$) in the area of the notch. Along their length, the inner and/or outer walls are full height (i.e., equal to wall height X) for a majority or more than 50% of their length. In some cases, the wall(s) are full height for a greater percentage of the length, such as approximately 60%, 70%, 80%, or 90% or any appropriate percentage. In some cases, where no notches are present (see FIGS. 1A, 1B, 5A-5C, 11A, and 11B), the walls are full height for approximately 100% of their length.

As shown in FIGS. 2A-2C, 5A-6B, and 8A-9B, the cavities include a foam member (251, 551, 651, 851, 951) inserted inside the one or more cavities during the manufacturing process. The foam member acts as a gasket or sealing member when the fastening tape is placed in a cavity or on protrusion in a mold chamber before the component foam is introduced into the mold chamber. More specifically, the fastening tape (100, 200, 300, 400, 500, 600, 700, 800, 900, 1000, 1100, 1200) is inverted such that the foam member (251, 551, 651, 851, 951) touches and seals against the mold surface 3. The foam member may prevent component foam from reaching the attachment portions (120, 220, 320, 420, 520, 620, 720, 720, 820, 920, 1020, 1120a-1120c, 1220a-1220c). In some examples, the foam is injected in a continuous manner along the longitudinal direction of the fastening tape. As shown in FIG. 5C, the continuous outer wall 501 and the continuous inner wall 502 extend from the bottom of the fastening tape 500 a distance X (i.e., the wall height). Because the foam member 551 is designed to compress when being pressed against the mold surface 3 (i.e., as shown in FIG. 1C), the foam member 551 extends from the bottom of the fastening tape 500 a distance Y (i.e., the uncompressed height), where Y>X. The difference or offset between the wall height X of the outer and/or inner walls 501, 502 and the uncompressed height Y of the foam member 551 is Δ. In some non-limiting examples, offset Δ is approximately 0.5 mm. For example, wall height X may be approximately 1.7 mm and uncompressed height Y may be approximately 2.2 mm. Based on the compression of the foam member, the final gap Z (see FIG. 1C) between the fastening tape (100, 200, 300, 400, 500, 600, 700, 800, 900, 1000, 1100, 1200) and the mold 1 may be approximately 0.0 to 0.2 mm. The distances X, Y, and Z may vary as needed for a particular application.

Figure 11A:
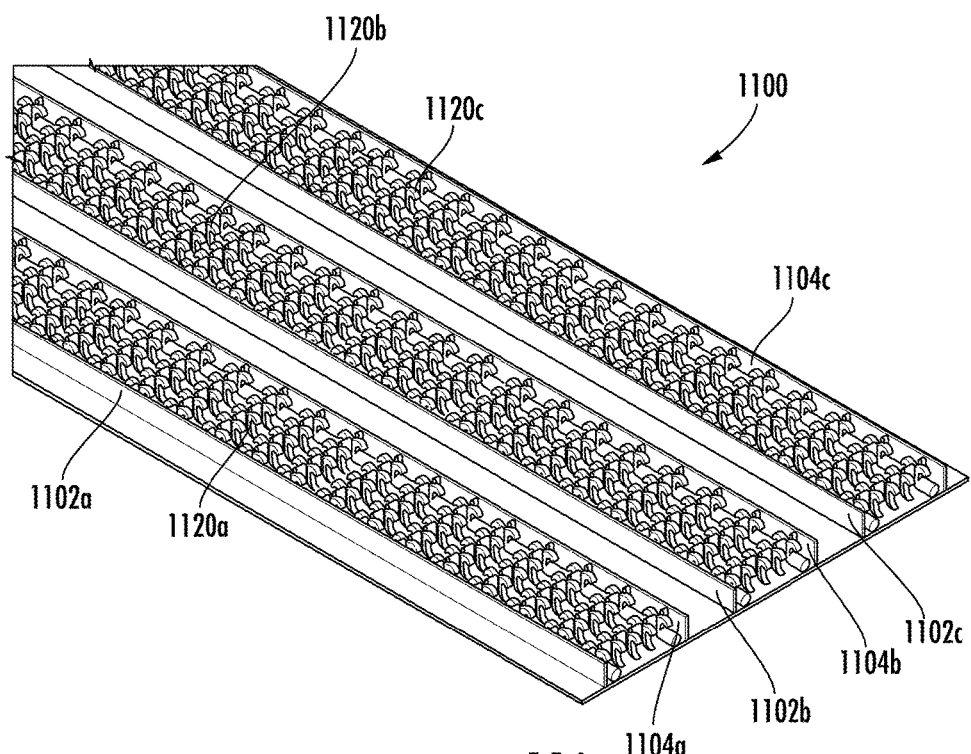
FIG. 11A is a perspective view of fastening tape according to certain aspects.
Figure 11B:
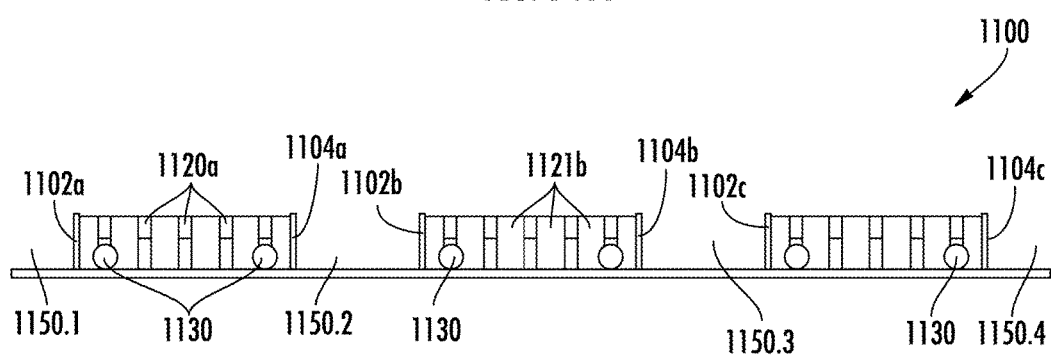
FIG. 11B is an end view of the fastening tape of FIG. 11A.

In some examples, the one or more cavities of fastening tape may be configured without inner walls, without outer walls, or without both inner and outer walls. For example, FIGS. 11A and 11B illustrate a fastening tape 1100 that does not include outer walls. In some cases, multiple fastening tape portions may be extruded parallel one another. The multiple fastening tape portions may be adjacent but are spaced apart from one another. Further, the fastening tape portions may be separated from one another (i.e., cut along a line approximately parallel to the fastening tape portions) or may remain connected. Although FIGS. 11A-12B show cases where three fastening tape portions are manufactured parallel to one another, any appropriate number of fastening tape portions may be manufactured in parallel. As illustrated, the first fastening tape portion of FIGS. 11A and 11B includes a first inner wall 1102a and a second inner wall 1104a. A first cavity 1150.1 is disposed adjacent to the first inner wall 1102a. As shown in FIG. 11B, a cavity 1150.2 is located between the second inner wall 1104a of the first fastening tape portion and the first inner wall 1102b of the second fastening portion. A foam member may be injected into one or more of the cavities 1150.1-1150.4. The foam member may be injected before the fastening tape portion are separated from one another such that the inner walls of adjacent fastening tape portions helps retain the foam member within the cavity. For example, a foam member may be injected into cavities 1150.2 and/or 1150.3 before the fastening tape portions are separated from one another. If desired, the foam member may be cut along its length approximately at its center such that, after separation, each fastening tape portion includes a foam member.

Figure 12A:
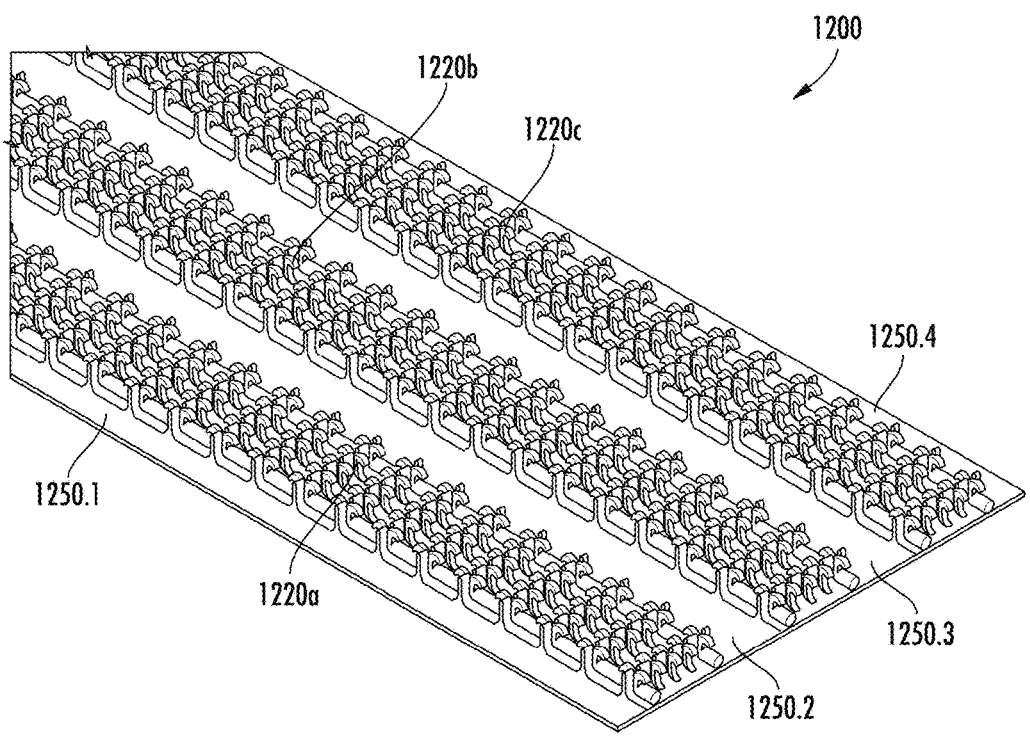
FIG. 12A is a perspective view of fastening tape according to certain aspects.
Figure 12B:
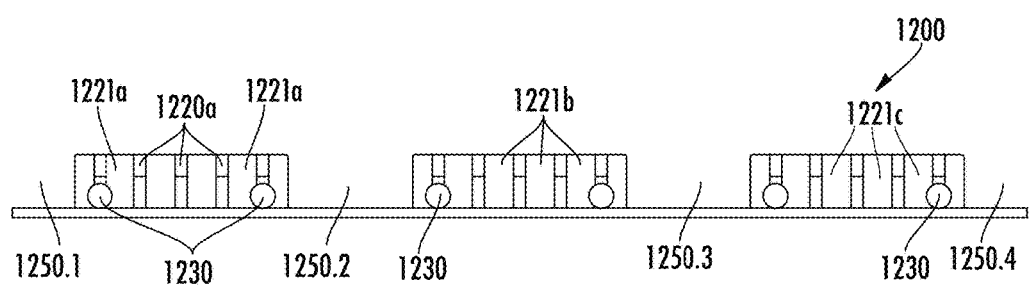
FIG. 12B is an end view of the fastening tape of FIG. 12A.

FIGS. 12A and 12B illustrate fastening tape portions that do not include inner walls or outer walls. The cavities 1250.1-1250.4 are disposed adjacent to the attachment portions 1220a-1220c and laterally extending walls 1221a-1221c. In these cases, the attachment portions and/or laterally extending walls function as walls to prevent intrusion of the foam member into the center section of each fastening tape portion. In some cases, one or more rows (extending along the longitudinal direction) of the attachment portions 1220a-1220c may act as inner walls for the fastening tape portions.

The fastening tape (100, 200, 300, 400, 500, 600, 700, 800, 900, 1000, 1100, 1200) may also include one or more magnetic portions (130, 230, 330, 430, 730, 830, 1030, 1130, 1230) made up of a magnetic material such as iron or a ferrous alloy. For example, the magnetic portion (130, 230, 1130, 1230) may be an iron monofilament that is approximately cylindrical and may extend in a longitudinal direction of the fastening tape generally parallel to the one or more cavities (150, 250, 1150.1-1150.4, 1250.1-1250.4). The magnetic portion may be made from nylon resin containing iron powder, so the nylon may be softened by heat generated from the extrusion process. In certain cases, the magnetic portion is secured to the fastening tape physically (rather than chemically) by pressing the magnetic portion into the resin while the resin is soft from being heated. In some examples, the magnetic portion (330, 430, 730) may comprise a mixture of plastic resin and iron powder. In certain cases, the magnetic portion may be extruded. Further, the fastening tape itself may be mixed with a magnetic material (such as iron powder) before extruding the fastening tape such that at least a portion of the fastening tape is magnetic, and, in some cases, the entirety of the fastening tape is magnetic. For example, fastening tape (100, 200, 300, 400, 600, 700, 800, 1000, 1100, 1200) may include magnetic material mixed with the material of the fastening tape in addition to the magnetic portion. Further, in some examples, magnetic material is mixed with the material of the fastening tape in lieu of a magnetic portion (e.g., fastening tape 500, 900).

Figure 7A:
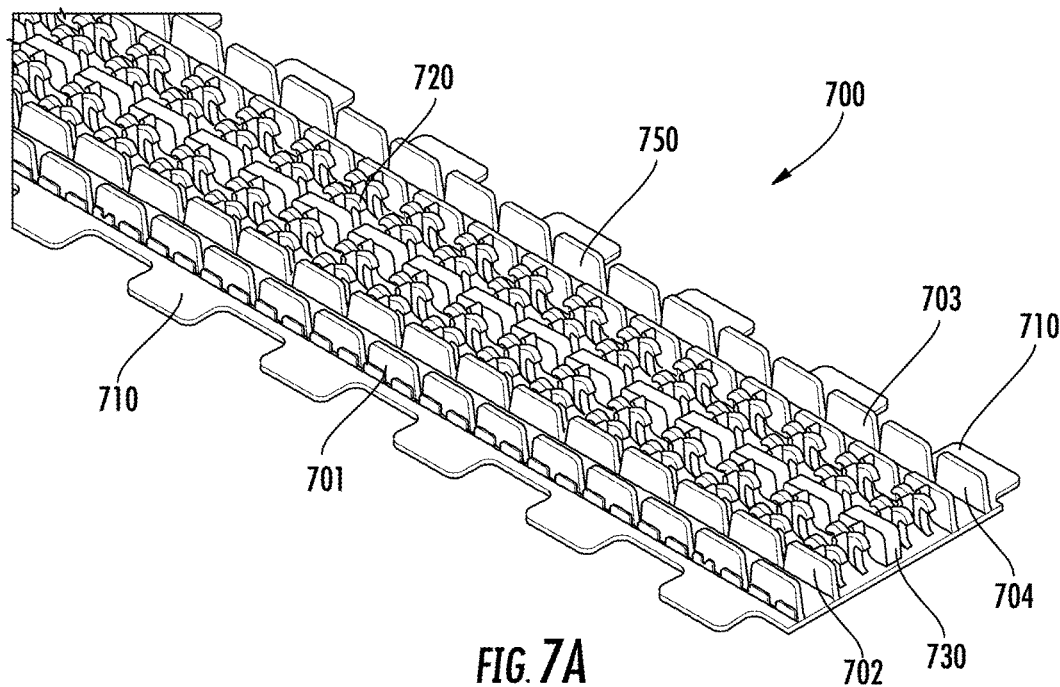
FIG. 7A is a perspective view of fastening tape according to certain aspects.
Figure 7B:
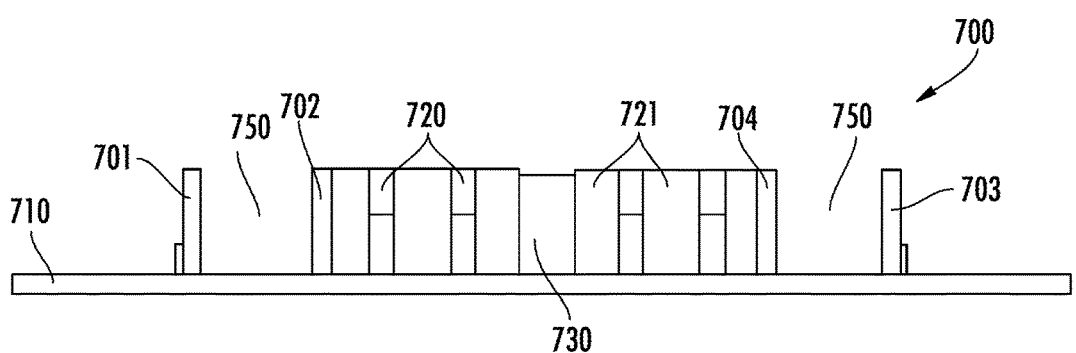
FIG. 7B is an end view of the fastening tape of FIG. 7A.

The magnetic portion (130, 230, 330, 430, 730, 830, 1030, 1130, 1230) may be offset from a bottom of the fastening tape and, in some cases, may extend to or near an upper surface of the fastening tape 700 as shown in FIGS. 7A and 7B, which show a single centrally located (such as along the lateral direction) magnetic portion 730. It may be advantageous to arrange the magnetic portion close to the upper surface of the fastening tape to improve the magnetic properties of the fastening tape because the fastening tape may be inverted and placed directly against a magnet in a mold. In some cases, the magnetic portion is positioned so it is substantially the same as height as the attachment portions, although it need not be. In some examples, it may be advantageous to locate the magnetic portion adjacent to a bottom of the fastening tape (e.g., for increasing manufacturing efficiency or optimizing weight distribution).

Figure 3A:
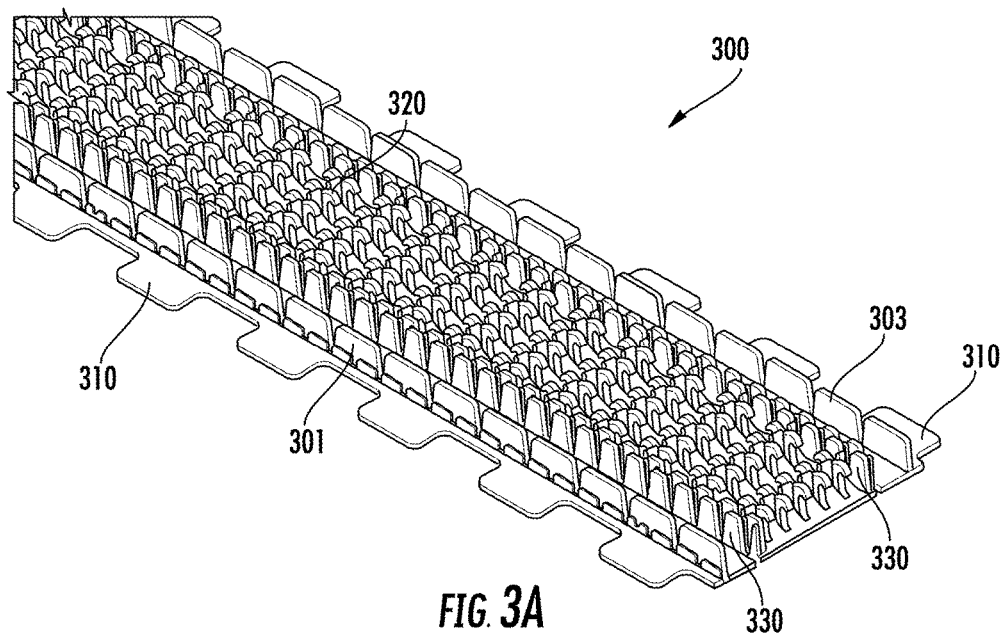
FIG. 3A is a perspective view of fastening tape according to certain aspects.
Figure 3B:
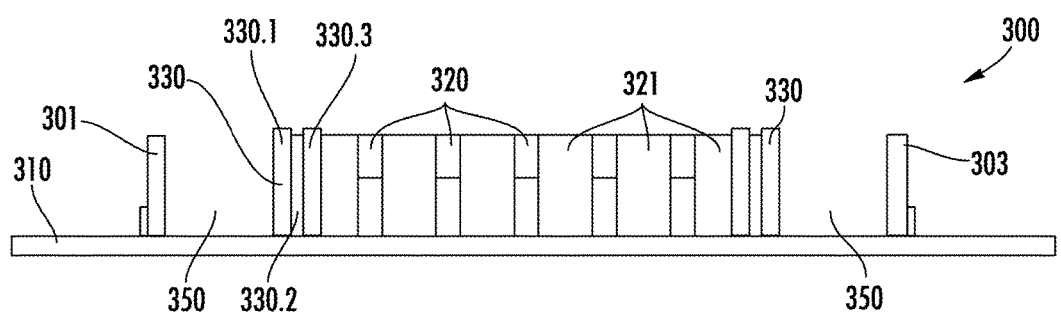
FIG. 3B is an end view of the fastening tape of FIG. 3A.
Figure 3C:
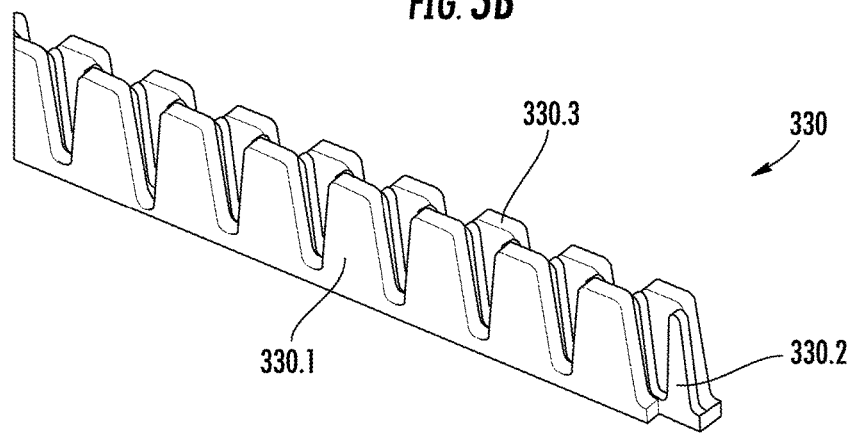
FIG. 3C is a detail view of a portion of the fastening tape of FIG. 3A.
Figure 4A:
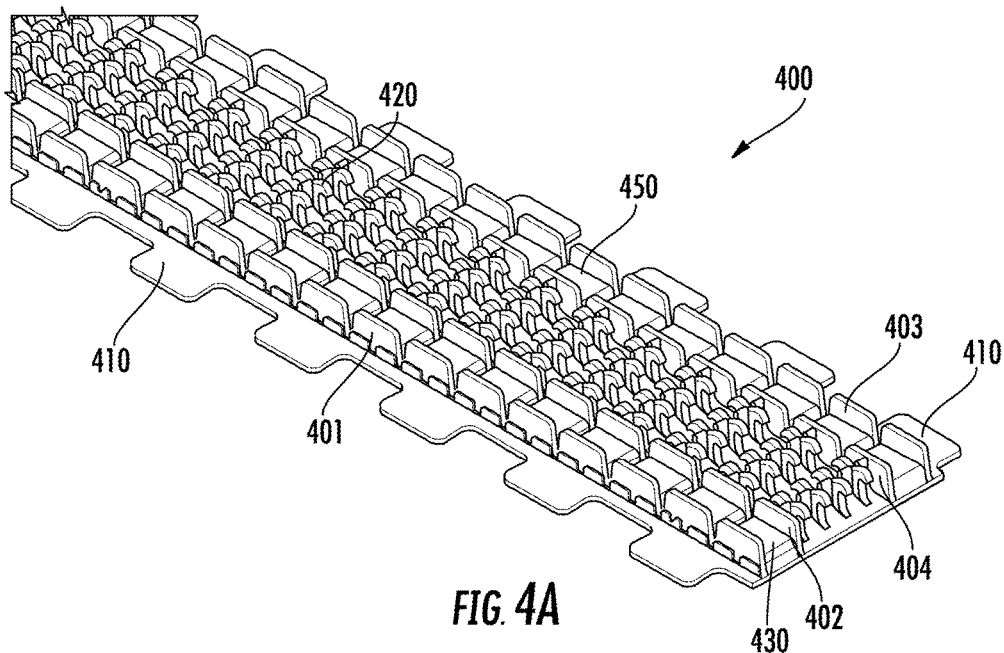
FIG. 4A is a perspective view of fastening tape according to certain aspects.
Figure 4B:
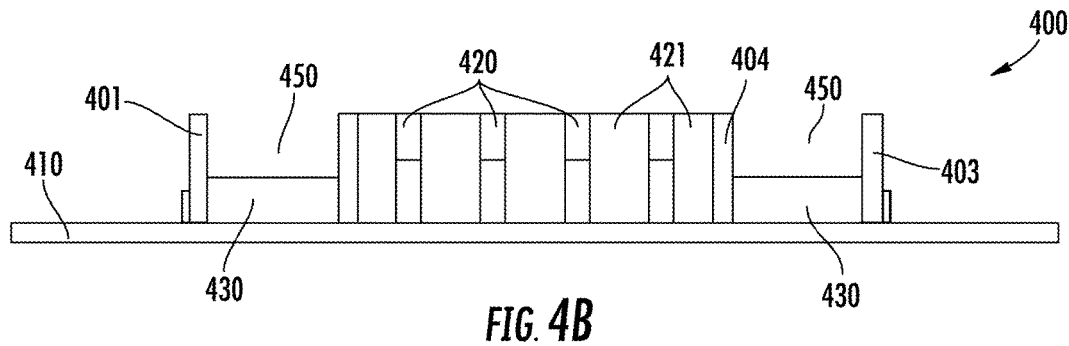
FIG. 4B is an end view of the fastening tape of FIG. 4A.
Figure 4C:
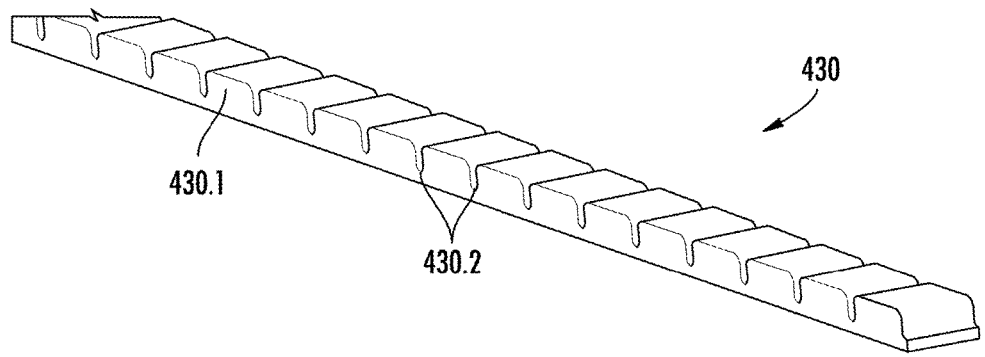
FIG. 4C is a detail view of a portion of the fastening tape of FIG. 4A.
Figure 5A:
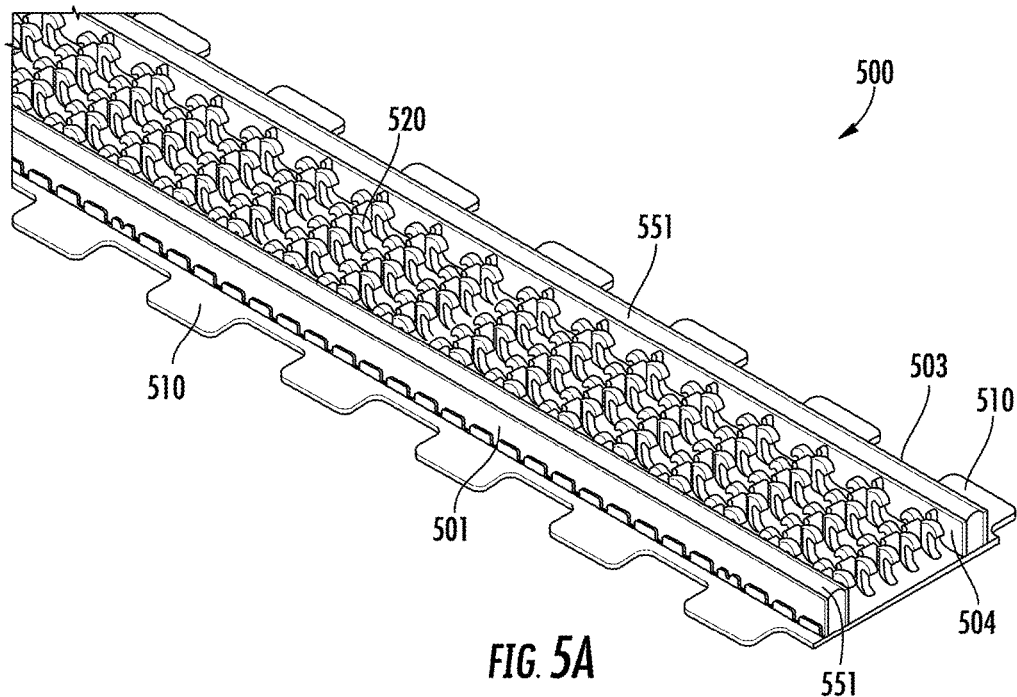
FIG. 5A is a perspective view of fastening tape according to certain aspects.
Figure 5B:
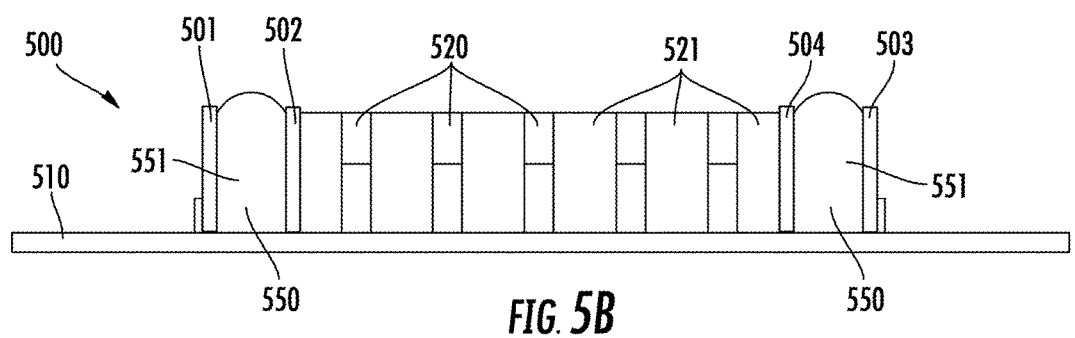
FIG. 5B is an end view of the fastening tape of FIG. 5A.
Figure 5C:
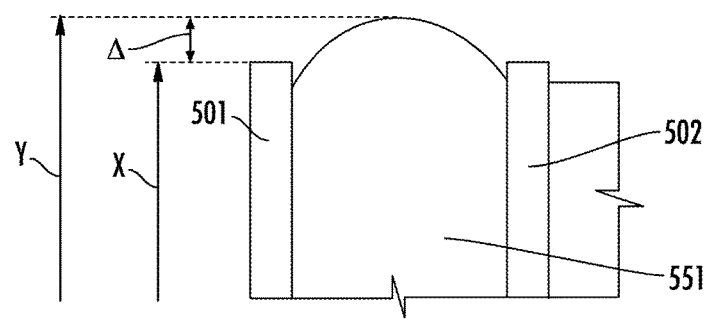
FIG. 5C is a detail view of a portion of the fastening tape of FIG. 5A.

In some examples, the one or more magnetic portions are configured to be more flexible, either by cutting the magnetic portions into separate pieces or by making a series of notches in the magnetic portions (e.g., see FIGS. 3C and 4C). For example, as shown in FIG. 4C, the magnetic portions 430 may be continuous and include main portions 430.1 separated by notches 430.2. Because the magnetic portions include the notches 430.2, the fastening tape is more flexible, thus allowing the fastening tape to conform better to a curved surface on which the tape is positioned, which in turn reduces the likelihood of component foam intruding into the attachment portions (120, 220, 320, 420, 520, 620, 720, 820, 920, 1020, 1120a-1120c, 1220a-1220c). As shown in FIGS. 4A and 4B, in some cases, the magnetic portions 430 may be disposed in the one or more cavities 450. This arrangement of the magnetic portions 430 reduces the volume of each cavity 450, thus reducing the amount of material required when injecting foam into the one or more cavities 450. Although FIGS. 4A and 4B do not show a foam member, it should be understood that a foam member may be disposed in cavity 450 on top of magnetic portions 430. Similarly, although not illustrated, cavities 150, 350, 750, 1050, 1150.1-1150.4, and 1250.1-1250.4 may also include a foam member. As a described above, a foam member may be injected into one or more of these cavities.

Another option for notched magnetic portions is shown in FIGS. 3A-3C. The one or more cavities 350 may include a wall of magnetic material. Specifically, FIGS. 3A-3C show an example where the inner wall 330 of each cavity 350 includes a magnetic material. In some cases, the outer wall (301, 303) or the inner and outer walls may include a magnetic material. In some cases, as shown in FIGS. 3B and 3C, the magnetic inner wall 330 may include three layers including an outer layer 330.1, a central layer 330.2, and an inner layer 330.3. As illustrated in FIG. 3C, the inner and outer layers (330.3, 330.1) may be similar to, but offset from, one another such that notches from one layer align with the main portions of the other layer. The central layer 330.2 may be configured to include notches that align with the notches of one or both the inner and outer layers (330.3, 330.1).

In some examples, the fastening tape does not include any magnetic portions. For example, fastening tapes 500 and 900 do not include any magnetic portions (see FIGS. 5A-5C and 9A-9C) and a corresponding mold would also need not include any magnets. In some cases, the fastening tape 500 may include a foam member 551 having an adhesive or tackiness feature that promotes a bond or attachment between the foam member 551 and the mold surface. The adhesive feature also helps adhere the foam member 551 within the cavity 550. Similarly, fastening tape 900 may include a foam member 951 having an adhesive or tackiness feature that promotes a bond or attachment between the foam member 951 and the mold surface, and between the foam member 951 and the cavity 950. The foam member (551, 951) may be a pressure-sensitive adhesive resin and/or a tackifying resin. Tackifying resins may include, but are not limited to, one or more of the following: terpenes, synthetic terpenes, modified terpenes, terpene-phenol resins, and derivatives of such. Additional tackifiers may be present and include, but are not limited to, wood rosins, tall oil and gum rosins, rosin esters, aliphatic, aromatic, and aliphatic-aromatic petroleum based tacifiers. The foam member (551, 951) may also include plasticizers which make the gasket material more workable. Plasticizers may include, but are not limited to, liquid or solid plasticizers such as hydrocarbon oils, polybutylene, liquid tackifying resins and elastomers. Solid plasticizing agents should have softening points above approximately 50° C. A fastening tape that includes a foam member (551, 951) with adhesive features instead of magnetic features simplifies the manufacturing process and reduces cost by eliminating magnetic material from the manufacturing process. In addition, these adhesive or tackiness features may be combined with magnetic or other features described herein to optimize the attachment of the fastening tape and the corresponding mold surface.

Figure 6A:
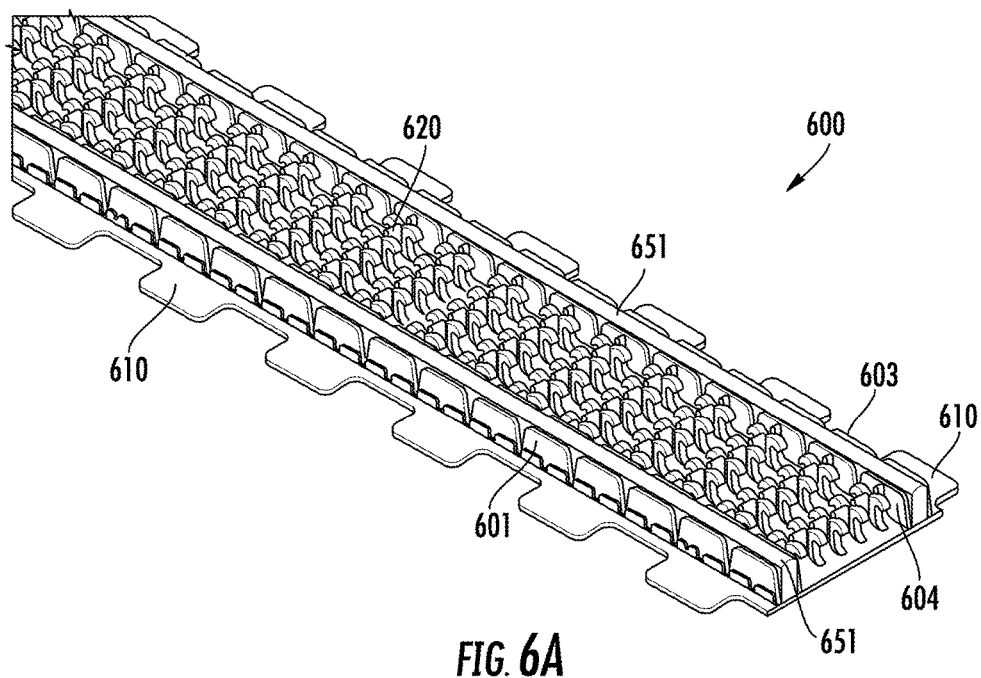
FIG. 6A is a perspective view of fastening tape according to certain aspects.
Figure 6B:
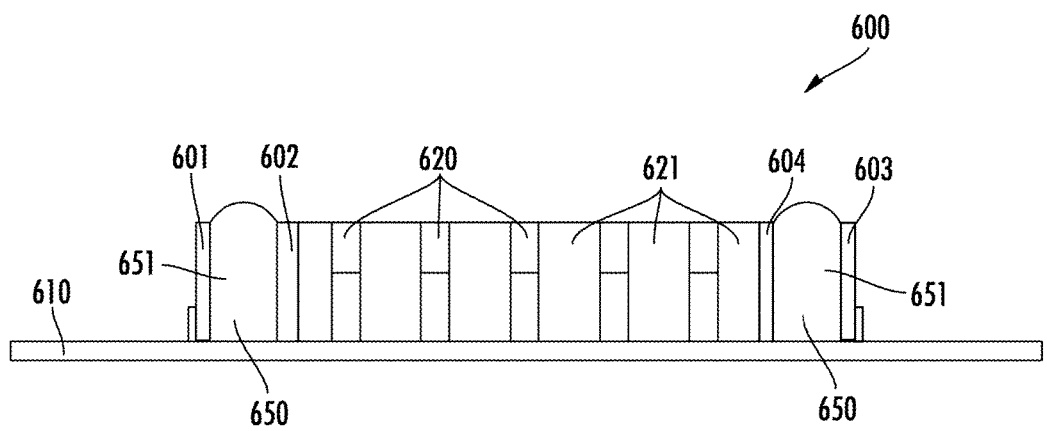
FIG. 6B is an end view of the fastening tape of FIG. 6A.

The foam member 651 shown in FIGS. 6A and 6B may include a magnetic material mixed into the material that is injected into the one or more cavities 650. For example, in some examples, iron powder is mixed with the material that is injected to form the one or more foam members 651. In addition, this feature of including magnetic material within the foam member may be combined with the adhesive or tackiness features described and/or with the magnetic or other features described herein to optimize the attachment of the fastening tape and the corresponding mold surface. For example, a foam member may include both pressure-sensitive adhesive and magnetic material mixed therein. Further, such a foam member (with one or both of the adhesive and integral magnetic material) may be combined with one or more magnetic portions (130, 230, 330, 430, 730, 830, 1030, 1130, 1230).

The magnetic portion (330, 430, 730) may comprise a mixture of plastic resin and iron powder. In some examples, the magnetic portion may be extruded. Further, for the example shown in FIGS. 6A and 6B, instead of magnetic material mixed into the foam member 651 (as described above), the fastening tape 600 itself may be mixed with a magnetic material (such as iron powder) before the extruding the fastening tape 600 such that the entirety of the fastening tape 600 is magnetic.

While FIGS. 1A-3C show multiple magnetic portions, each disposed adjacent to a cavity, in some examples, the fastening tape may include a single magnetic portion (730, 1030) that is centrally located (such as in the lateral direction of the fastening tape) as shown in FIGS. 7A, 7B, 10A, and 10B. The magnetic portions (730, 1030) shown in FIGS. 7A, 7B, 10A, and 10B do not extend as high toward the top of the fastening tape (700, 1000) as the attachment portions (720, 1020) and the laterally extending walls (721, 1021). However, in some examples, the upper surfaces of the magnetic portion (730, 1030) are approximately coplanar with the upper surfaces of the attachment portions (720, 1020) and the laterally extending walls (721, 1021).

Figure 8A:
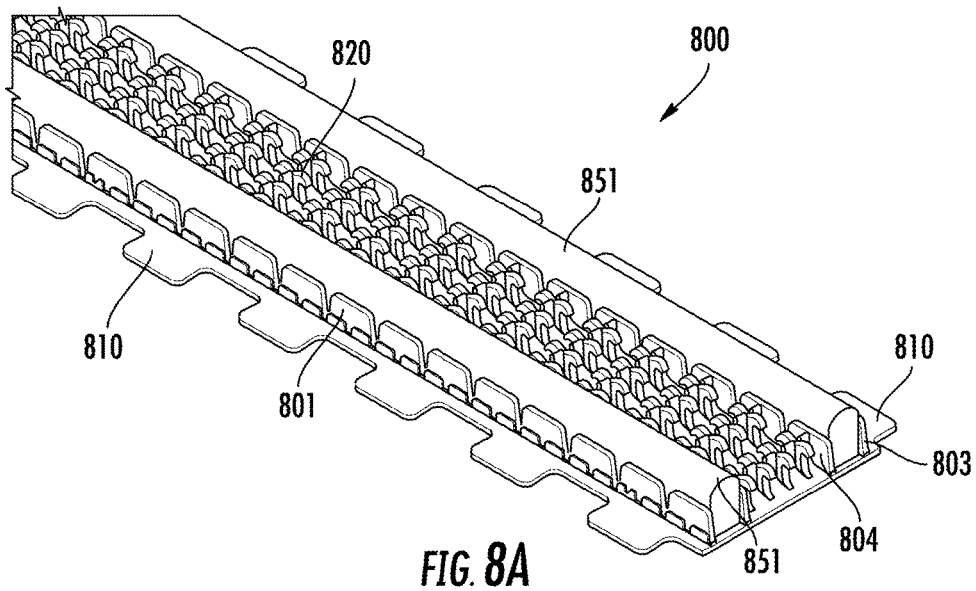
FIG. 8A is a perspective view of fastening tape according to certain aspects.
Figure 8B:
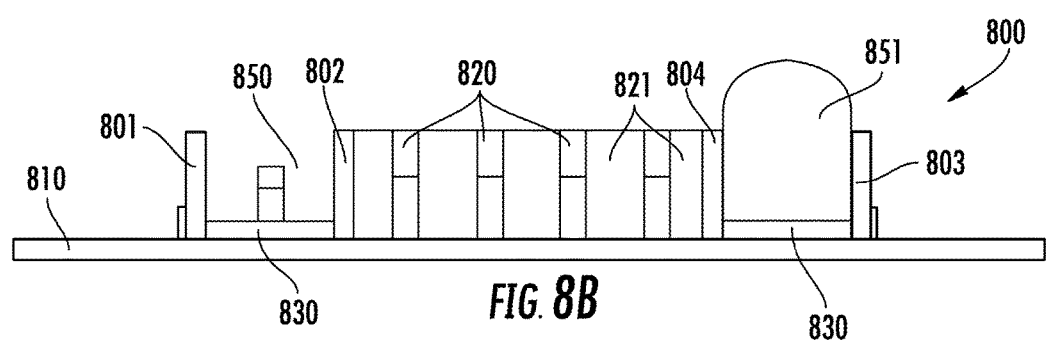
FIG. 8B is an end view of the fastening tape of FIG. 8A.
Figure 8C:
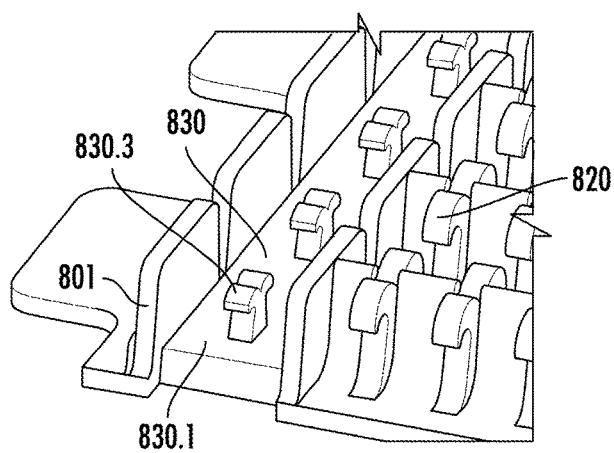
FIG. 8C is a detail view of a portion of the fastening tape of FIG. 8A.
Figure 8D:
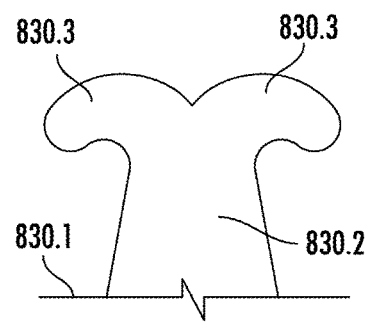
FIG. 8D is a detail view of a hook of the fastening tape of FIG. 8A.
Figure 9A:
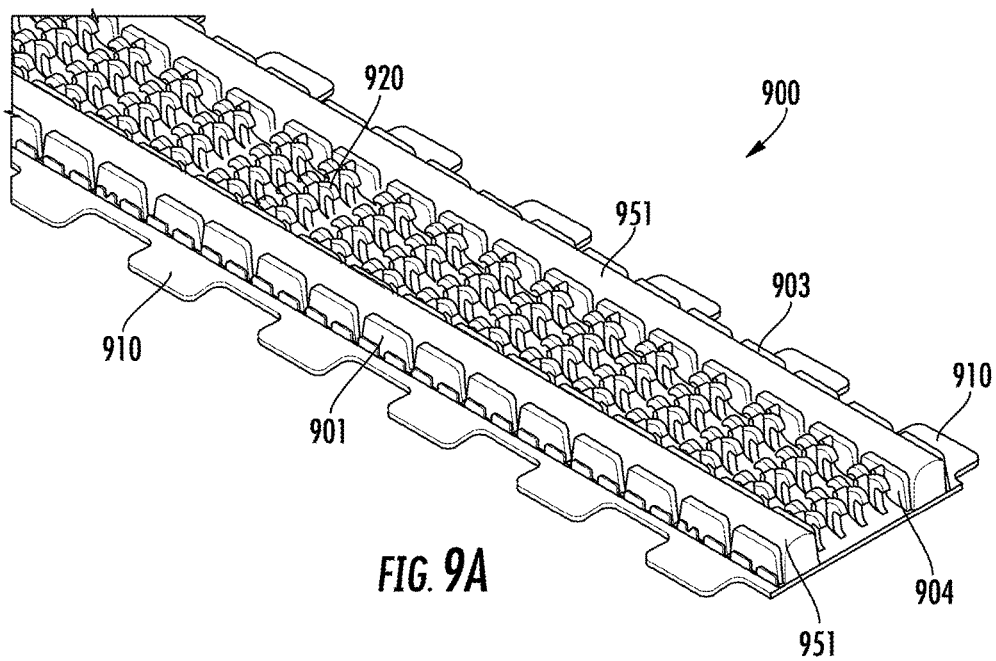
FIG. 9A is a perspective view of fastening tape according to certain aspects.
Figure 9B:
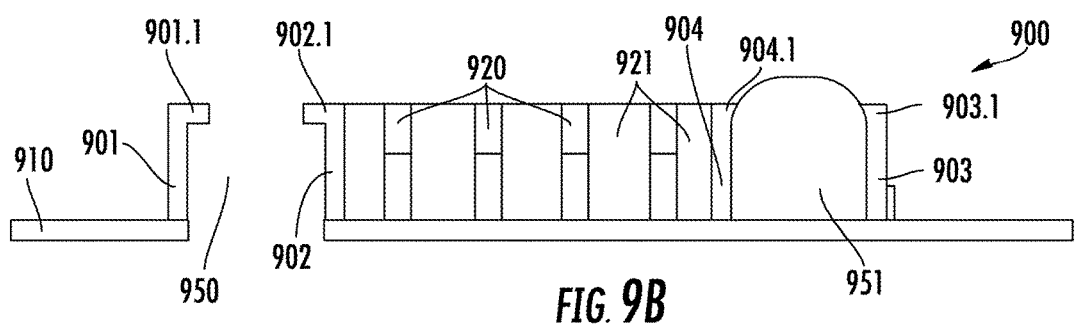
FIG. 9B is an end view of the fastening tape of FIG. 9A.
Figure 9C:
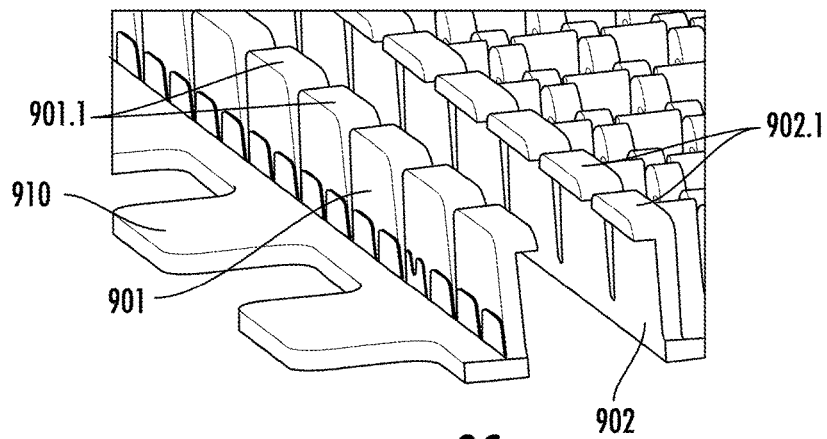
FIG. 9C is a detail view of a portion of the fastening tape of FIG. 9A.

In some examples where the magnetic portions are disposed within the one or more cavities (e.g., magnetic portions 430 as described above), the magnetic portions may include one or more projections extending upwards a top surface of the fastening tape. For example, the fastening tape 800 shown in FIGS. 8A-8D includes a magnetic portion 830 having a plurality of projections. FIG. 8A shows each cavity 850 with a foam member 851, FIG. 8B shows an end view with one foam member 851 removed and one foam member in one of the cavities 850, and FIG. 8C shows a single cavity without a foam member 851. As illustrated, each projection includes an upwardly extending portion 830.2 from the base surface 830.1 of the magnetic portion 830 and one or more hook portions 830.3. The projection may have any desired configuration (such as J-shaped, etc.) and is not limited to the illustrated example. When a foam member is injected into the one or more cavities, the hook portions 830.3 provide resistance to prevent the foam member from disengaging from the cavity. FIGS. 8A-8D show the hook portions 830.3 extending away from the upwardly extending portion 830.2 in directions parallel to the longitudinal direction of the fastening tape. However, the hook portions 830.3 may extend away from the upwardly extending portion 830.2 in other directions including the lateral direction of the fastening tape. Further, FIGS. 8A-8D show a single row of projections extending in the longitudinal direction of the fastening tape 800. However, the cavities 850 may include any number of rows of projections.

Figure 10A:
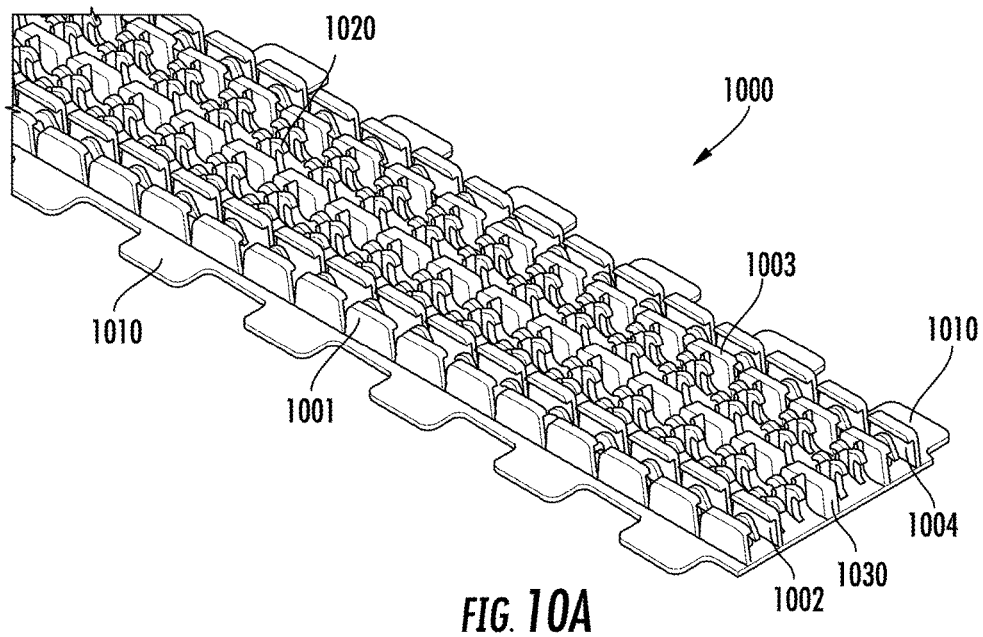
FIG. 10A is a perspective view of fastening tape according to certain aspects.
Figure 10B:
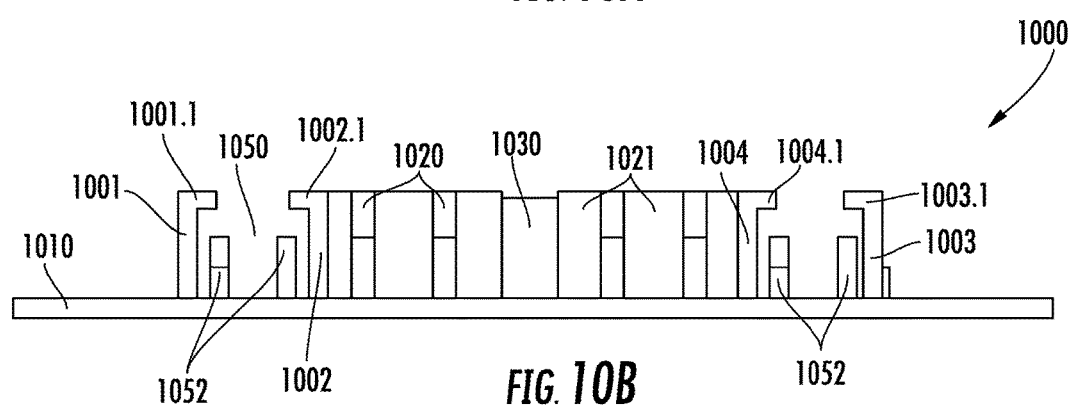
FIG. 10B is an end view of the fastening tape of FIG. 10A.
Figure 10C:
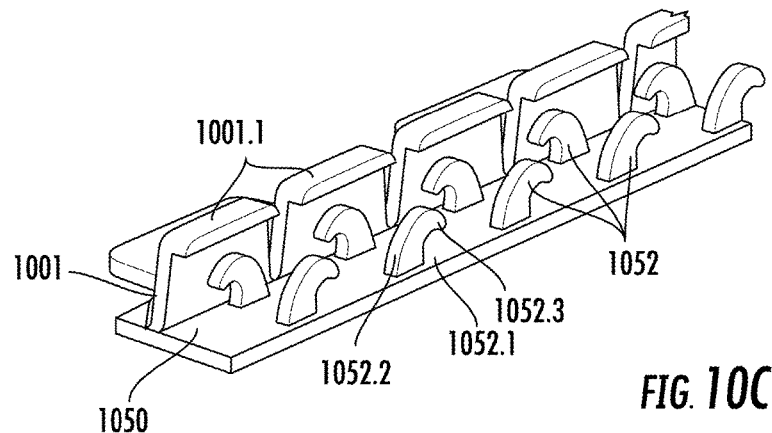
FIG. 10C is a detail view of a portion of the fastening tape of FIG. 10A.

Although the examples in FIGS. 8A-8D show projections that extend from the magnetic portion 830 (where the magnetic portions 830 are disposed in the at least one cavity), in some examples, the projections may extend directly from the one or more cavities 850 instead of from a magnetic portion. For example, as shown in FIGS. 10A-10C, the fastening tape 1000 includes a plurality of projections 1052 disposed within the cavity 1050. The projections 1052 extend from a base surface 1052.1 of the cavity 1050. Each projection 1052 includes an upwardly extending portion 1052.2 from the base surface 1052.1 of the cavity 1050 and one or more hook portions 1052.3. Any number of projections may be used, and they may have any desired configuration. In some examples, the projections 1052 are arranged in two rows (each extending along the longitudinal direction of the fastening tape 1000), where a first row includes hook portions 1052.3 extending away from the upwardly extending portion 1052.2 in a first direction parallel to the longitudinal direction of the fastening tape 1000. As shown in FIG. 10C, the second row includes hook portions 1052.3 extending away from the upwardly extending portion 1052.2 in a second direction parallel to the longitudinal direction of the fastening tape 1000, where the second direction is opposite of the first direction. However, the projections may be arranged in any suitable configuration.

The fastening tape may include other features configured to prevent the foam member from dislodging from the cavity. For example, as shown in FIGS. 9A-10C, the outer walls (901, 903, 1001, 1003) and/or the inner walls (902, 904, 1002, 1004) may include a feature disposed at an upper edge of the wall configured to capture or prevent removal of a foam member from the one or more cavities. For example, for fastening tape 900, the first outer wall 901 may include an inwardly facing protrusion 901.1 (i.e., protruding into the cavity 950) and the second outer wall 903 may include an inwardly facing protrusion 903.1 (i.e., protruding into the cavity 950). Additionally or alternatively, the first inner wall 902 may include an inwardly facing protrusion 902.1 (i.e., protruding into the cavity) and the second inner wall 904 may include an inwardly facing protrusion 904.1 (i.e., protruding into the cavity). For fastening tape 1000, the first outer wall 1001 may include an inwardly facing protrusion 1001.1 (i.e., protruding into the cavity) and the second outer wall 1003 may include an inwardly facing protrusion 1003.1 (i.e., protruding into the cavity). Additionally or alternatively, the first inner wall 1002 may include an inwardly facing protrusion 1002.1 (i.e., protruding into the cavity) and the second inner wall 1004 may include an inwardly facing protrusion 1004.1 (i.e., protruding into the cavity). In some cases, the inwardly facing protrusions are formed by pressing the tops of the respective walls downward.

After the foam member is placed (for example, injected) into the at least one cavity, the inwardly facing protrusions restrict the size of the opening at the top of the cavity to engage the foam member and increase the force required to remove the foam member from the cavity, thus reducing the probability of disengagement of the foam member from the cavity. In addition, the inwardly facing protrusions feature may be combined with other features configured to secure the foam member within the cavity such as the adhesive features (see FIGS. 5A-5C and 9A-9C) or the projections features (see FIGS. 8A-8D and 10A-10C).

The components of the fastening tape may be formed of materials including, but not limited to, nylon, polypropylene, non-woven polypropylene, other plastic materials, thermoplastic, metallic materials, other composite materials, cotton, wool, synthetic fabric, or other similar materials. Moreover, the components of the fastening tape may be attached to one another via suitable fasteners, which include, but are not limited to, glue or any suitable adhesive, hook and loop fasteners, ultrasonic welding, other mechanical or chemical fasteners.

Different arrangements of the components depicted in the drawings or described above, as well as components and steps not shown or described are possible. Similarly, some features and sub-combinations are useful and may be employed without reference to other features and sub-combinations. Cases of the invention have been described for illustrative and not restrictive purposes, and alternative cases will become apparent to readers of this patent. Accordingly, the present invention is not limited to the cases described above or depicted in the drawings, and various cases and modifications may be made without departing from the scope of the claims below.

That which is claimed is:
1. A fastening tape comprising:
 a plurality of attachment portions extending upwardly from a bottom portion of the fastening tape;
 at least one inner wall disposed adjacent to at least some of the plurality of attachment portions;
 at least one outer wall offset from the at least one inner wall such that a cavity is disposed between the at least one inner wall and the at least one outer wall; and
 an injected foam member disposed in the cavity, wherein:
 at least one of the at least one inner wall and the at least one outer wall extends along a length and a height of the cavity such that the at least one of the at least one inner wall and the at least one outer wall blocks more than approximately 50% of a side of the cavity; and
 the injected foam member comprises a gasket member for sealing against a mold surface to prevent component foam from reaching the plurality of attachment portions.

2. The fastening tape of claim 1, further comprising at least one magnetic portion.

3. The fastening tape of claim 2, wherein the at least one magnetic portion comprises an iron monofilament that is approximately cylindrical and that extends in a longitudinal direction of the fastening tape.

4. The fastening tape of claim 2, wherein:
 the at least one magnetic portion comprises a plurality of main portions and a plurality of notches; and
 the at least one magnetic portion is disposed within the cavity.

5. The fastening tape of claim 2, wherein:
 the at least one magnetic portion comprises a plurality of hook portions; and
 the at least one magnetic portion is disposed within the cavity such that the injected foam member surrounds the plurality of hook portions.

6. The fastening tape of claim 1, wherein the injected foam member comprises iron powder mixed therein.

7. The fastening tape of claim 1, wherein the injected foam member comprises a pressure-sensitive adhesive resin.

8. The fastening tape of claim 1, wherein at least one of the at least one inner wall and the at least one outer wall each comprises an inwardly facing protrusion configured to hold the injected foam member in position within the cavity.

9. The fastening tape of claim 1, wherein:
 a base of the cavity comprises a plurality of projections; and
 the injected foam member surrounds the plurality of projections.

10. The fastening tape of claim 1, wherein at least one of the at least one inner wall and the at least one outer wall is continuous.

11. The fastening tape of claim 1, wherein the fastening tape comprises a mixture of plastic resin and iron powder such that at least a portion of the fastening tape is magnetic.

12. The fastening tape of claim 1, wherein a height of the injected foam member from the bottom portion of the fastening tape is greater than a height of the at least one inner wall and a height of the at least one outer wall from the bottom portion of the fastening tape.

13. A fastening tape comprising:
 a plurality of attachment portions extending upwardly from a bottom portion of the fastening tape;
 at least one inner wall disposed adjacent to at least some of the plurality of attachment portions;
 at least one outer wall offset from the at least one inner wall such that a cavity is disposed between the at least one inner wall and the at least one outer wall;
 an injected foam member disposed in the cavity; and
 at least one magnetic portion, wherein:

at least one of the at least one inner wall and the at least one outer wall extends along a length and a height of the cavity such that the at least one of the at least one inner wall and the at least one outer wall blocks more than approximately 50% of a side of the cavity; and the at least one magnetic portion comprises an iron monofilament that is approximately cylindrical and that extends in a longitudinal direction of the fastening tape.

14. A fastening tape comprising:

a plurality of attachment portions extending upwardly from a bottom portion of the fastening tape;

at least one inner wall disposed adjacent to at least some of the plurality of attachment portions;

at least one outer wall offset from the at least one inner wall such that a cavity is disposed between the at least one inner wall and the at least one outer wall; and an injected foam member disposed in the cavity, wherein:

at least one of the at least one inner wall and the at least one outer wall extends along a length and a height of the cavity such that the at least one of the at least one inner wall and the at least one outer wall blocks more than approximately 50% of a side of the cavity; and at least one of the at least one inner wall and the at least one outer wall each comprises an inwardly facing protrusion configured to hold the injected foam member in position within the cavity.

* * * * *